United States Patent
Yabune et al.

(10) Patent No.: US 11,662,706 B2
(45) Date of Patent: May 30, 2023

(54) LIFE EXPECTANCY PREDICTION SYSTEM FOR A TOOL

(71) Applicant: JTEKT CORPORATION, Osaka (JP)

(72) Inventors: Natsuki Yabune, Kariya (JP); Toshihiro Yonezu, Nishio (JP); Koichi Kato, Nagakute (JP); Yuki Ishigure, Gifu (JP)

(73) Assignee: JTEKT CORPORATION, Kariya (JP)

( * ) Notice: Subject to any disclaimer, the term of this patent is extended or adjusted under 35 U.S.C. 154(b) by 311 days.

(21) Appl. No.: 17/074,684

(22) Filed: Oct. 20, 2020

(65) Prior Publication Data

US 2021/0132578 A1   May 6, 2021

(30) Foreign Application Priority Data

Oct. 30, 2019   (JP) .............................. JP2019-196846

(51) Int. Cl.
  *G05B 19/406* (2006.01)
  *G05B 19/4065* (2006.01)
  *G06N 20/00* (2019.01)
  *G05B 19/18* (2006.01)

(52) U.S. Cl.
  CPC ....... *G05B 19/4065* (2013.01); *G05B 19/182* (2013.01); *G06N 20/00* (2019.01)

(58) Field of Classification Search
  CPC ... G05B 19/4065; G05B 19/182; G06N 20/00
  USPC ........................................................ 700/160
  See application file for complete search history.

(56) References Cited

U.S. PATENT DOCUMENTS

| 2019/0049939 A1 | 2/2019 | Kato et al. | |
| 2019/0369598 A1* | 12/2019 | Kubo | G05B 19/4065 |
| 2020/0279158 A1* | 9/2020 | Tsunoda | G05B 19/4155 |

FOREIGN PATENT DOCUMENTS

| JP | 2019-082836 A | 5/2019 | |
| JP | 2019082836 A | * 5/2019 | G05B 19/4065 |

* cited by examiner

*Primary Examiner* — Hien D Khuu
(74) *Attorney, Agent, or Firm* — Oblon, McClelland, Maier & Neustadt, L.L.P.

(57) ABSTRACT

A life expectancy prediction system for a target tool includes a processing machine body, a detector to detect a state data, a learned model storage unit to store learned models generated by executing machine learning using training datasets, including an explanatory variable and an objective variable, the explanatory variable being the state data and the objective variable being a number of first remaining machining times, the learned model storage unit being to store the learned models, each for each of the tools and a remaining machining times prediction unit to select, based on the state data, one learned model and predict a number of second remaining machining times, using the one learned model and the state data.

11 Claims, 13 Drawing Sheets

FIG. 5

TOOL-MODEL CORRESPONDENCE TABLE

| TOOL No. | MODEL No. |
|---|---|
| a | A |
| b | B |
| c | C |
| d | D |
| e | E |
| f | F |
| g | G |
| . . . | . . . |

FIG. 8

| | FEATURE VALUE OF STATE DATA 82b | NUMBER OF ACTUAL MACHINING TIMES 82c | |
|---|---|---|---|
| 1 | DATA(N1) | N1 | |
| ... | ... | ... | |
| p | DATA(Np) | Np | ···SUBJECT TO CURRENT PREDICTION |

LIFE EXPECTANCY PREDICTION SYSTEM FOR A TOOL

The present application claims priority to Japanese Patent Application No. 2019-196846 filed on Oct. 30, 2019, the entire content of which is incorporated herein by reference.

TECHNICAL FIELD

The present invention relates to a life expectancy prediction system for a target tool.

BACKGROUND

Prediction of life expectancy of a tool for machining is important from a viewpoint of tool cost. In the related art, in terms of a life expectancy of a tool, the number of machining times with which a tool is assumed to have reached an end of its life, or assumed to start failing, is determined in advance in consideration of individual variations of tools and a safety factor. However, in such a life expectancy determining method, even when a tool has not yet actually failed, it is considered that the tool has reached the end of a life, and the tool is to be replaced.

A related-art life expectancy prediction system for a tool predicts a life expectancy of a tool, when machining is performed by a tool, for example, a drive current of a motor of a spindle device, using information associated with the machining (see, for example, JP2019-82836A). In this prediction method, a life expectancy of a tool is predicted using an arithmetic model determined based on information associated with machining. The arithmetic model used for predicting a life expectancy of a tool is selected from among a plurality of arithmetic models according to, for example, a material of a workpiece, machining conditions, or the like.

In prediction of a life expectancy of a tool, different prediction results are to be obtained depending on the arithmetic model used for the prediction. Therefore, determination as to which arithmetic model should be used for predicting a life expectancy of a tool is an important factor. For, even if types of tools, materials of workpieces, and machining conditions are the same, lengths of tool life may be different depending on individual tools.

SUMMARY

Illustrative aspects of the present invention provide a life expectancy prediction system for a tool configured to predict a life expectancy of a tool with higher accuracy.

According to an illustrative aspect of the present invention, a life expectancy prediction system for a target tool includes a processing machine body configured to machine a workpiece using a tool, a detector configured to detect an observable state in the processing machine body during machining of the workpiece and to obtain data including the observable state as a state data, a learned model storage unit configured to store a plurality of learned models generated by executing machine learning using a plurality of training datasets, each including an explanatory variable and an objective variable, the explanatory variable being the state data and the objective variable being a number of first remaining machining times based on a number of first machining times for which the tool had machined the workpiece until the tool has failed, the learned model storage unit being configured to store the plurality of the learned models, each for each of a plurality of life expectancy patterns that each of a plurality of the tools has and a remaining machining times prediction unit configured to select, based on the state data, one learned model out of the plurality of learned models and predict a number of second remaining machining times based on a number of second machining times for which the target tool is predicted to be able to machine the workpiece until the target tool fails, using the one learned model and the state data.

According to the life expectancy prediction system for a target tool, one learned model is selected out of a plurality of learned models, and a life expectancy of the target tool, which is currently being used, is predicted using the one learned model which has been selected. The selection of the one learned model to be used for predicting the life expectancy of the target tool uses state data obtained during machining performed by the target tool. Therefore, the selected one learned model corresponds to, or is unique to the target tool. In this way, since the one learned model used for predicting the life expectancy of the target tool corresponds to the tool, so that it is possible to predict the life expectancy of the tool with high accuracy.

BRIEF DESCRIPTION OF DRAWINGS

FIG. 5 is a table showing a correspondence table of a tool No. and a learned model No.;

FIG. 8 shows information acquired for p times by the remaining machining times prediction unit;

DESCRIPTION OF EMBODIMENTS

A life expectancy prediction system for a tool predicts a life expectancy of a tool in a processing machine that machines a workpiece using the tool, in other words, the life expectancy prediction system predicts when the tool for machining a workpiece will reach the end of its life. Here, the end of a life of a tool means not only a state in which the tool has completely failed but also a state in which the tool needs maintenance or to be modified. For example, modification of a tool is re-grinding of the tool, truing of a grinding wheel, dressing, or the like.

The processing machine includes a processing machine that performs cutting such as a machining center, a lathe, a gear machining device, a boring machine, or the like. In this case, the tool is a cutting tool. For example, tools in the machining center include a drill, a milling tool, a boring tool, a gear machining tool, a turning tool, and the like. Tools in the lathe include at least a turning tool, and tools in a composite lathe include, in addition to the turning tool, a drill, a milling tool, and the like, which are tools similar to the tools in the machining center. The gear machining device includes a gear skiving machine, a hobbing machine, a shaper processing machine, and the like. Tools in the gear machining device include gear machining tools which are a gear skiving tool, a hobbing tool, a shaper tool, and the like.

The processing machine includes a grinding machine that performs grinding. Tools in the grinding machine include a grinding wheel. The processing machine includes a forging machine such as a press machine, a rolling machine, or the like. Tools in the press machine or in the rolling machine include a forging punch, a forging die, and the like.

Figure 1:
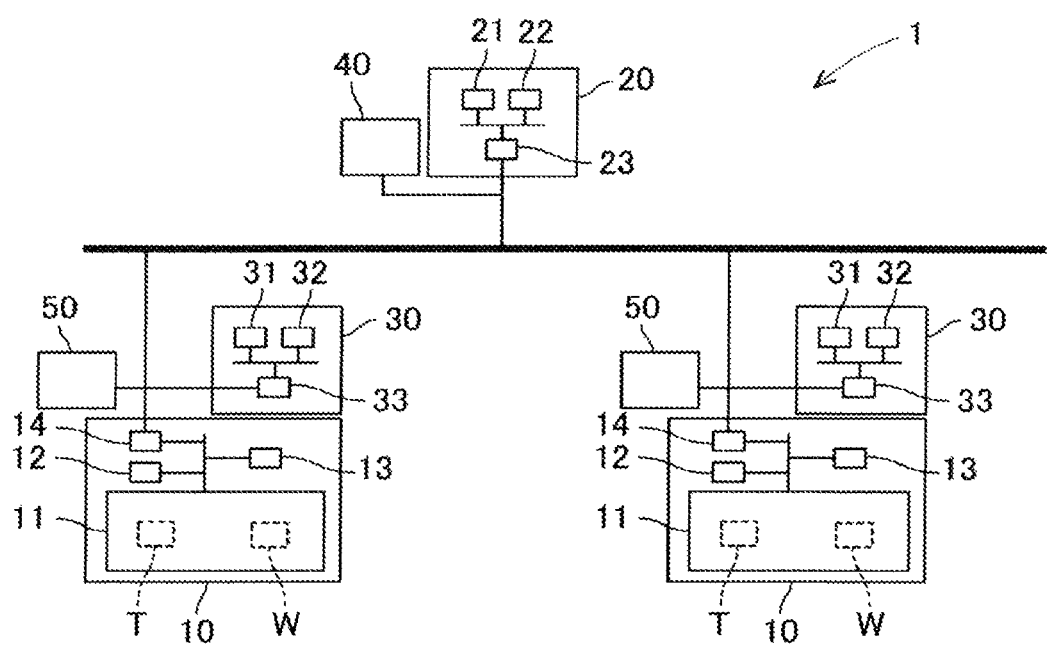
FIG. 1 shows a configuration of a life expectancy prediction system for a tool.

An outline of a configuration of a life expectancy prediction system 1 for a tool will be described with reference to FIG. 1. The life expectancy prediction system 1 for a tool includes at least one processing machine 10 and one arithmetic device 20, 30. A single processing machine 10 may be used, or a plurality of processing machines 10 may be used as shown in FIG. 1. In the present embodiment, a case is described as an example in which the life expectancy prediction system 1 for a tool includes the plurality of processing machines 10.

The processing machine 10 includes at least a processing machine body 11 configured to machine a workpiece W using a tool T, and a detector 13 configured to detect state data in the processing machine body during machining of the workpiece W, i.e. the detector 13 is configured to detect an observable state in the processing machine body during machining of the workpiece W and obtain information including the observable state as the state data.

The arithmetic device 20, 30 is configured to predict a life expectancy of the tool T by applying machine learning using the state data detected by the detector 13. In FIG. 1, the arithmetic device 20, 30 includes a learning processing device 20 and a prediction arithmetic device 30. The learning processing device 20 and the prediction calculation device 30 are shown here as separated devices, but may also be a single device including the learning processing device 20 and the prediction calculation device 30. A part or all of the arithmetic device 20, 30 may also be an embedded system in the processing machine 10.

In the present embodiment, a case is described as an example in which the learning processing device 20 and the prediction arithmetic device 30 are separated devices. The learning processing device 20 has a so-called server function and is connected to the plurality of processing machines 10 in a manner that the learning processing device 20 is configured to communicate with the processing machines 10. Meanwhile each prediction arithmetic device 30 is provided to each one of the processing machines 10, and is connected to a respective one of the processing machines 10 in a manner that the prediction arithmetic device 30 is configured to communicate with the respective one of the processing machines 10. That is, a plurality of prediction arithmetic devices 30 function as so-called edge computers, and can realize high-speed arithmetic processing.

The configuration of the life expectancy prediction system 1 for a tool will be described in more detail with reference to FIG. 1. The life expectancy prediction system 1 for a tool includes the plurality of processing machines 10, one learning processing device 20 that functions as a part of an arithmetic device, and the plurality of prediction arithmetic devices 30 that function as the rest part of the arithmetic device.

As described above, various processing machines can be applied to the processing machines 10. The processing machine 10 includes the processing machine body 11 configured to machine the workpiece W using the tool T, a control device 12 configured to control the processing machine body 11, the detector 13, and an interface 14.

The processing machine body 11 includes the tool T, and is configured to support the workpiece W and to move the tool T and the workpiece W relative to each other. That is, the processing machine body 11 includes a structure and a drive configured to drive the structure.

The control device 12 includes a CNC device, a PLC device, and the like. The control device 12 is configured to control the drive and the like in the processing machine body 11. The interface 14 is a device capable of communicating with the processing machine body 11, the control device 12, the detector 13, and a device or the like outside the processing machine 10.

The detector 13 is configured to detect state data in the processing machine body 11 during machining of the workpiece W. The detector 13 is configured to detect data relating to, for example, a processing load, a drive load of the drive, and the like. The detector 13 may be, for example, a current sensor configured to detect drive current data of a motor which is the drive device (i.e. a current sensor configured to detect a current of a motor and to obtain data including a state of the current as drive current data), a vibration sensor configured to detect vibration data of a constituent member of the processing machine body 11 (i.e. a vibration sensor configured to detect vibration of a constituent member of the processing machine body 11 and obtain data including a state of the vibration as vibration data), a microphone configured to detect sound data during machining (i.e., a microphone configured to detect sound during machining and obtain data including a state of the sound as sound data), or the like. That is, the state data is, for example, drive current data, vibration data, sound data, or the like.

The learning processing device 20 includes a processor 21, a storage device 22, an interface 23, and the like. The learning processing device 20 has a server function and is communicably connected to the plurality of processing machines 10.

The learning processing device 20 is configured to generate a learned model for predicting the life expectancy of the tool T by applying machine learning based on the state data detected by the detector 13. In particular, the learning processing device 20 is configured to generate a learned model for each of a plurality of life expectancy patterns of each of a plurality of tools T. That is, the learning processing device 20 is configured to generate a plurality of learned models for each of the plurality of tools T, defining that each of the plurality of tools T has different life time.

For example, in the learning processing device 20, a plurality of learned models are generated by generating one learned model for each tool T among the plurality of tools T of the same type. That is, the learning processing device 20 generates a learned model for each of the plurality of life expectancy patterns by generating a learned model for each of the individual tools T assuming or defining that the life expectancy patterns of the individual tools T, even if the tools T are of the same type, are all different from each other.

Each prediction arithmetic device 30 includes a processor 31, a storage device 32, an interface 33, and the like. Each prediction arithmetic device 30 is communicably connected to the learning processing device 20 which is a server and a corresponding one of the processing machines 10 to which a corresponding prediction arithmetic device 30 is installed.

Each prediction arithmetic device 30 is provided at a position close to a respective one of the processing machines 10, and functions as a so-called edge computer. The prediction arithmetic device 30 is configured to predict the life expectancy of the tool T based on the state data detected by the detector 13 during machining of the workpiece W using the plurality of learned models generated by the learning processing device 20. In the present embodiment, the prediction arithmetic device 30 is configured to predict the number of remaining machining times, that is, the number of remaining times for which the tool T can machine the workpiece W before reaching the end of its life.

In particular, in the present embodiment, the prediction arithmetic device 30 is configured to select one of the plurality of learned models, and to predict the life expectancy of the tool T using the selected one among the plurality of learned models. A specific example of a selection method will be described later.

The life expectancy prediction system 1 for a tool further includes a common display device 40 and a plurality of individual display devices 50. However, the life expectancy prediction system 1 for a tool may not include the common display device 40 or may not include the individual display devices 50. The common display device 40 is provided to the learning processing device 20. Each individual display device 50 is provided to respective one of the processing machines 10.

As an example of the processing machine body 11, a gear machining device configured to perform gear skiving will be described with reference to FIG. 2. As described above, the gear machining device is an example of the processing machine body 11, and the processing machine body 11 may be applied to other processing machines.

Figure 2:
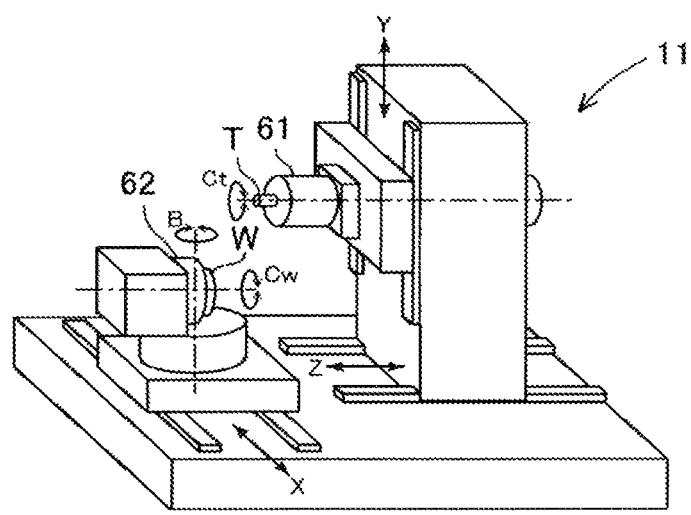
FIG. 2 shows an example of a processing machine.

As shown in FIG. 2, the processing machine body 11 as a gear machining device uses a five-axis machining center configuration including three linear axes and two rotational axes as drive axes for changing relative positions and postures of the workpiece W and the tool T with each other. In the present embodiment, the processing machine body 11 includes three orthogonal axes (an X axis, a Y axis, and a Z axis) as the linear axes, and a B axis and a Cw axis as the rotation axes. The B axis is a rotational axis around the Y axis, and the Cw axis is a rotational axis around a center axis of the workpiece W.

The processing machine body 11 includes a tool main shaft 61 that supports the tool T (a rotary tool) is rotatable about a Ct axis, and is movable in a direction along the Y axis and in a direction along the Z axis. Further, the processing machine body 11 includes a workpiece main shaft 62 that supports the workpiece W, is rotatable about the Cw axis, and is movable in a direction along the X axis. The processing machine body 11 includes a motor as a drive configured allow movement in directions along/about each of the axes (the X axis, the Y axis, the Z axis, the B axis, the Cw axis, and the Ct axis).

Figure 3:
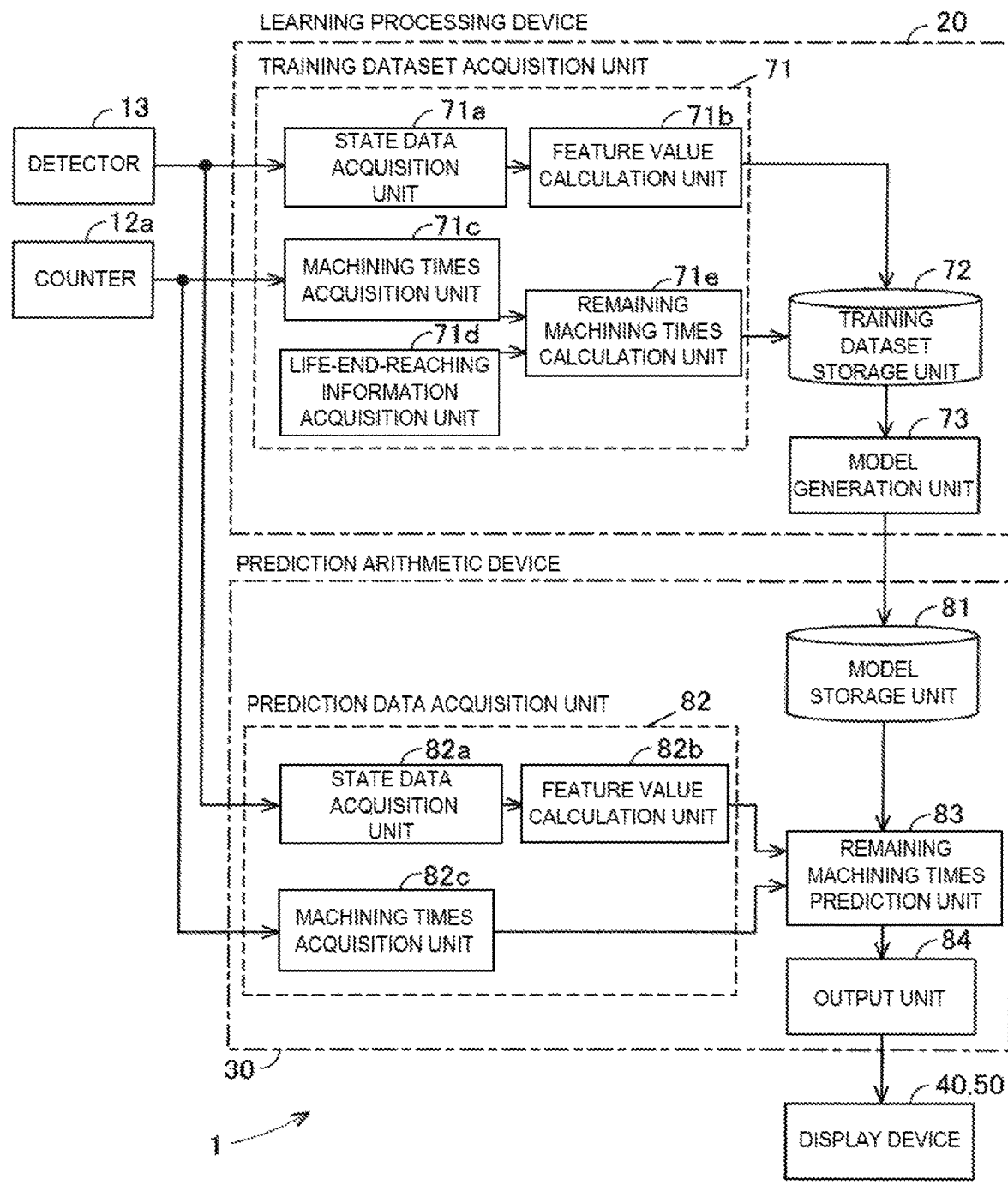
FIG. 3 shows a functional block configuration of the life expectancy prediction system fora tool.

Functional blocks of the life expectancy prediction system 1 for a tool will be described with reference to FIG. 3. The life expectancy prediction system 1 for a tool includes the detector 13, a counter 12a, the learning processing device 20, the prediction arithmetic device 30, and the display devices 40, 50.

As described above, the detector 13 is configured to detect state data in the processing machine body 11 during machining of the workpiece W. The state data includes, for example, drive load data of a motor which is configured to rotationally drive the rotary tool T. The state data further includes, for example, drive load data of a motor which is configured to rotationally drive the workpiece W. The drive load data corresponds to drive current data of the motor. The state data may include vibration data, machining sound data, and the like. The state data is time-series data from the beginning of machining to an end of machining on one workpiece W.

The counter 12a is provided in the control device 12 of the processing machine 10, and is configured to count, for each tool T, the number of machining times of the workpiece W. That is, the counter 12a is configured to count, for each tool T, the number of machining times of the workpiece W from the beginning of the usage of the tool T. The counter 12a may also be provided in the detector 13.

The learning processing device 20 is configured to generate a learned model for predicting the life expectancy of the tool T based on the state data detected by the detector 13 and data including the number of machining times obtained by the counter 12a. The learning processing device 20 includes a training dataset acquisition unit 71, a training dataset storage unit 72, and a model generation unit 73.

The training dataset acquisition unit 71 is configured to acquire a training dataset for performing machine learning for each individual tool T among the plurality of tools T of the same type. Here, the training dataset acquisition unit 71 is configured to acquire a training dataset for each of the plurality of life expectancy patterns by acquiring a training dataset for each of the individual tools T assuming that the life expectancy patterns of the individual tools T of the same type are different from each other.

The training dataset acquisition unit 71 includes an state data acquisition unit 71a, a feature value calculation unit 71b, a machining times acquisition unit 71c, a life-end-reaching information acquisition unit 71d, and a remaining machining times calculation unit 71e. The state data acquisition unit 71a is configured to acquire state data detected by the detector 13 during machining of the workpiece W. The state data acquisition unit 71a is configured to acquire state data obtained during one time of machining performed by one tool T for the number of the detectors 13. Then, the state data acquisition unit 71a acquires state data for each of the plurality of tools T of the same type.

The feature value calculation unit 71b is configured to calculate a plurality of feature values of the state data acquired by the state data acquisition unit 71a. Here, as the feature value, various statistical values in the state data are used. For example, the feature value may be a maximum value, a minimum value, an average value, a variance, a standard deviation, a skewness, a kurtosis, or a median value in the state data. The feature value may include a statistical value for data obtained by differentiating the state data, a statistical value for data obtained by executing frequency analysis of the state data, and the like. The feature value calculation unit 71b may calculate all the above-described feature values, or may calculate a part of the above-described feature values.

The machining times acquisition unit 71c is configured to acquire, from the counter 12a, the number of machining times of each individual tool T from the beginning of machining. The life-end-reaching information acquisition unit 71d is configured to receive an input indicating that the target tool T has reached the end of its life, i.e., an input indicating that the target tool T has failed. An operator may determine whether the target tool T has reached the end of its life and input this information into the life-end-reaching information acquisition unit 71d. Determination as to whether the target tool T has reached the end of its life can be made, for example, based on whether a flaw referred to as a tool mark has been formed on a surface of the workpiece W. Or, as another example, such determination can be made based on whether machining accuracy on the workpiece W is significantly reduced. This information may be input by an inspection device when the determination is made by the inspection device.

The remaining machining times calculation unit 71e is configured to determine the number of remaining machining times (first remaining machining times) of the tool T based on information including the number of machining times (first machining times) acquired by the machining times acquisition unit 71c and life-end-reaching information acquired by the life-end-reaching information acquisition unit 71d. The number of remaining machining times is zero when a tool has reached an end of a life, and increases in ascending order while time goes back to the past from the end of a life of a tool. A case where it is determined that a tool has reached the end of its life when the number of machining times is N is shown in a upper table in FIG. 4 and a case where the number of remaining machining times is zero when the tool has reached the end of a life and is (N−1) at the beginning is shown in a lower table in FIG. 4.

Figure 4:
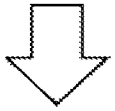
FIG. 4 shows calculation of the number of remaining machining times calculated by a remaining machining times calculation unit, and shows a training dataset.

The training dataset storage unit 72 is configured to store the training dataset acquired by the training dataset acquisition unit 71. Specifically, as shown in the lower table in FIG. 4, the training dataset storage unit 72 stores feature values DATA (1) to DATA (N) of the state data and the number of remaining machining times (N−1) to (0) in association with each other. A content shown in the lower table in FIG. 4 is a training dataset for a single tool T. That is, the training dataset storage unit 72 stores each of training datasets related to a respective one of the plurality of tools T.

The model generation unit 73 is configured execute machine learning using the training dataset stored in the training dataset storage unit 72. Specifically, the model generation unit 73 executes, for each life expectancy pattern, that is, for each individual tool T, machine learning with the feature value of the state data detected by the detector 13 as an explanatory variable and the number of remaining machining times (first remaining machining times) as an objective variable. Then, the model generation unit 73 generates a learned model for predicting the life expectancy of the tool T.

Here, the learned model is generated for each life expectancy pattern, that is, for each individual tool T. Therefore, the model generation unit 73 generates the learned models for the number of the plurality of tools T of the same type. A correspondence between the tool T and the learned model is as shown in FIG. 5. For example, a tool No. a corresponds to a learned model No. A, and the following has the same correspondence. All of the tools T shown in FIG. 5 are of the same type.

As a method of machine learning, for example, regression may be used. For example, linear regression, ridge regression, lasso, elastic net, random forest, and the like are useful. In particular, using these methods, it is possible to grasp a degree of influence by each of a plurality of feature values, and therefore it is possible, for example, to select a feature value as necessary. As a method of machine learning, a method other than regression may also be used.

The prediction arithmetic device 30 is configured to predict the life expectancy of the tool T, which is used for machining, based on the state data of machining in the corresponding processing machine 10. The prediction arithmetic device 30 includes a model storage unit 81, a prediction data acquisition unit 82, a remaining machining times prediction unit 83, and an output unit 84.

Figure 6:
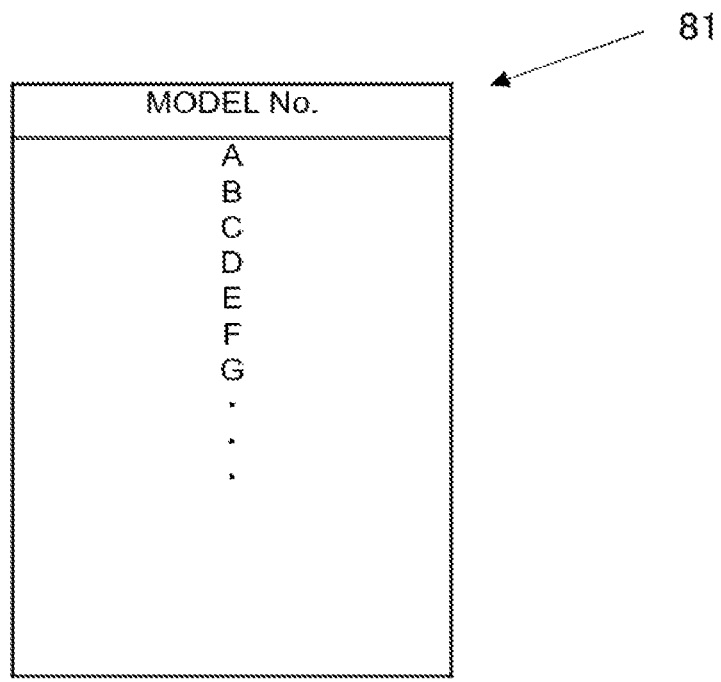
FIG. 6 shows a plurality of learned models stored in a model storage unit.

The model storage unit 81 is configured to store the plurality of learned models generated by the model generation unit 73. As shown in FIG. 6, the model storage unit 81 stores the plurality of learned models of model No. A, B, etc. As described above, each of the plurality of learned models corresponds to a respective one of the life expectancy patterns, and corresponds to a respective one of the tools T in the present embodiment.

The prediction data acquisition unit 82 is configured to acquire prediction data, i.e., data for making a prediction, during machining performed by the tool T to be predicted for its life expectancy, i.e., the target tool T. The prediction data acquisition unit 82 includes a state data acquisition unit 82a, a feature value calculation unit 82b, and an machining times acquisition unit 82c.

The state data acquisition unit 82a is configured to acquire state data detected by the detector 13 during machining of the workpiece W performed by the target tool T. Here, a type of the target tool T is the same as a type of the tool T used when the training dataset acquisition unit 71 acquires a training dataset.

The feature value calculation unit 82b is configured to calculate a feature value of the state data acquired by the state data acquisition unit 82a. Here, as the feature value, various statistical values in the state data are used. The kind of the feature value is the same as that of the feature value calculated by the feature value calculation unit 71b of the training dataset acquisition unit 71. The machining times acquisition unit 82c is configured to acquire, from the counter 12a, the number of machining times of the target tool T from the beginning of machining.

Here, the state data acquisition unit 82a and the feature value calculation unit 82b execute the same processing as that executed by the state data acquisition unit 71a and the feature value calculation unit 71b of the training dataset acquisition unit 71. In the present embodiment, the state data acquisition unit 82a and the feature value calculation unit 82b are described as separate elements from the state data acquisition unit 71a and the feature value calculation unit 71b of the training dataset acquisition unit 71. However, the elements 71a, 71b of the training dataset acquisition unit 71 may also be used as the elements 82a, 82b of the prediction data acquisition unit 82. That is, functions of the elements 71a, 71b in the learning processing device 20 can also be used as a part of functions of the prediction arithmetic device 30.

The remaining machining times prediction unit 83 is configured to select one learned model from among the plurality of learned models stored in the model storage unit 81, and to predict the number of remaining machining times (second remaining machining times) of the target tool T based on the selected one of the learned models and the data acquired by the prediction data acquisition unit 82. That is, the remaining machining times prediction unit 83 is configured to predict the number of workpieces W that can be machined by the target tool T, or to predict the number of machining times that the target tool T will be able to machine a single workpiece W. Details of processing executed by the remaining machining times prediction unit 83 will be described later.

The output unit 84 is configured to output information on the number of remaining machining times of the target tool T, which is predicted by the remaining machining times prediction unit 83, to the display devices 40, 50. In addition to the number of remaining machining times, the output unit 84 can also output the number of machining times until then and a prediction tendency of the selected learned model used for the prediction.

The display devices 40, 50 are configured to display information output from the output unit 84 of the prediction arithmetic device 30. The details of displayed contents of the display devices 40, 50 will be described later.

Figure 7:
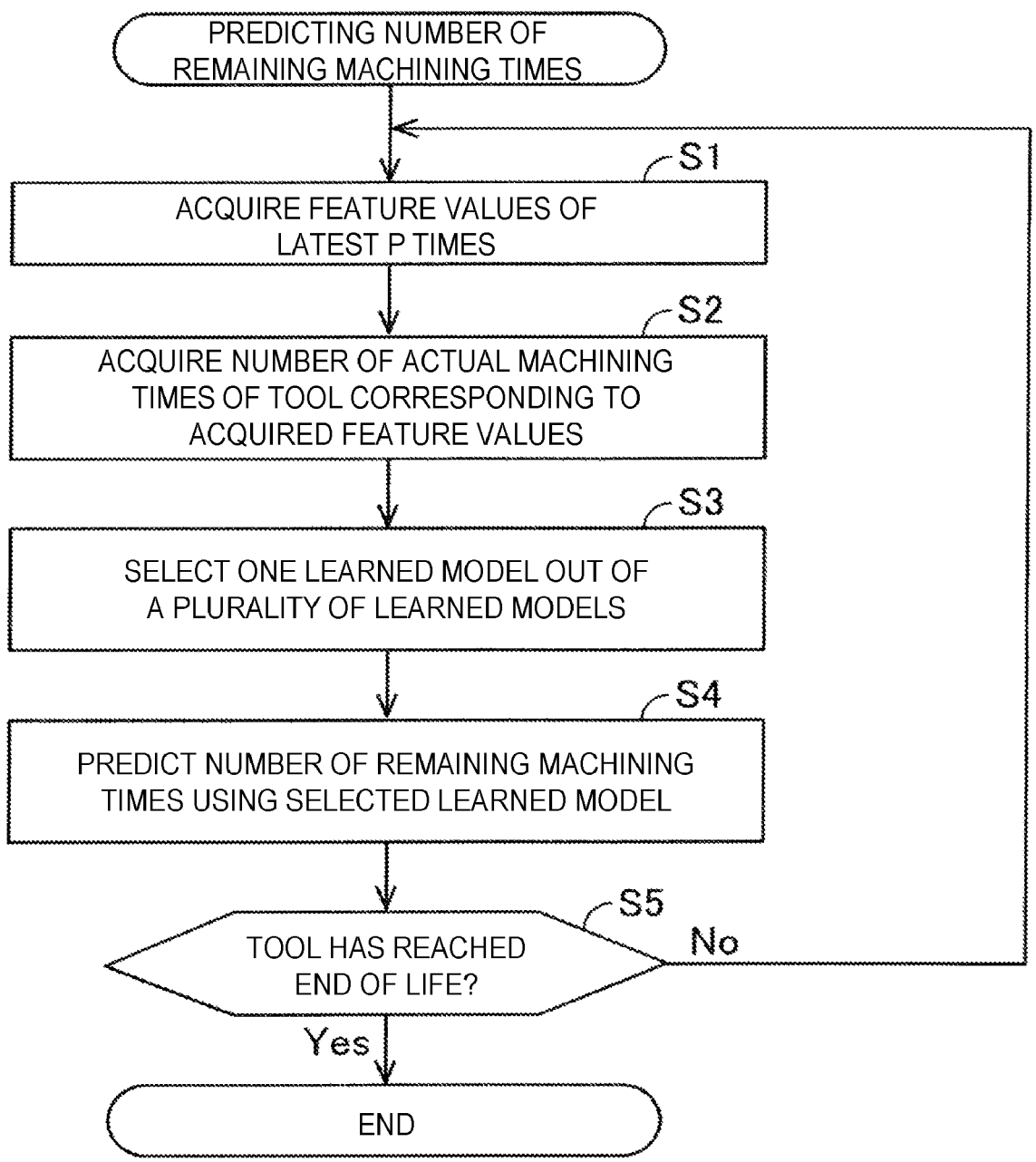
FIG. 7 is a flowchart showing processing in a remaining machining times prediction unit.

Processing executed by the remaining machining times prediction unit 83 (hereinafter, referred to as a "prediction unit") will be described with reference to FIGS. 7 to 9. As shown in FIG. 7, the prediction unit 83 acquires a plurality of feature values of state data for last plurality of times of machining (here last p times as an example) from the prediction data acquisition unit 82 (step S1). That is, the prediction unit 83 acquires a plurality of sets of feature values of the state data for a plurality of times (p times) of the latest machining of workpiece W for the target tool T.

Subsequently, the prediction unit 83 acquires, from the prediction data acquisition unit 82, information including the number (actual number) of actual machining times of the tool T corresponding the plurality of times of machining in which the plurality of sets of feature values have been acquired (step S2). In other words, as shown in FIG. 8, information acquired by the prediction unit 83 is the plurality of sets of feature values DATA (N1) to DATA (Np) of the latest p times of state data and the number of actual machining times (N1) to (Np) corresponding to the state data. The prediction unit 83 acquires the plurality of sets of feature values DATA (N1) to DATA (Np) and the number of actual machining times (N1) to (Np) in association with each other. A value of p may be, for example, approximately 5 to 10, but is not limited to 5 to 10. If p is set to a large value, prediction in an early stage cannot be executed. However, if p is set to a small value, prediction accuracy would be affected. Therefore, as described above, the optimum value of p is 5 to 10. The value of p may be changed depending on the number of machining times until the tool T would reach the end of a life.

Subsequently, the prediction unit 83 selects one learned model out of the plurality of learned models based on the plurality of sets of feature values of the latest p times of state data and the actual number of actual machining times corresponding thereto (hereinafter, referred to as "prediction target data" (step S3). The prediction unit 83 compares the latest p times of prediction target data with a data group in the training dataset of each of the plurality of learned models, and selects one learned model having a high degree of similarity.

An image depicting a case when one learned model is selected will be described with reference to FIG. 9. In FIG. 9, in a feature value space (an n-dimensional space) in which each of n feature values is represented as a dimension element, a transition of data (hereinafter, referred to as "basic data") in the training dataset of each of the plurality of learned models is indicated by white circles, arrows, and X marks.

Figure 9:
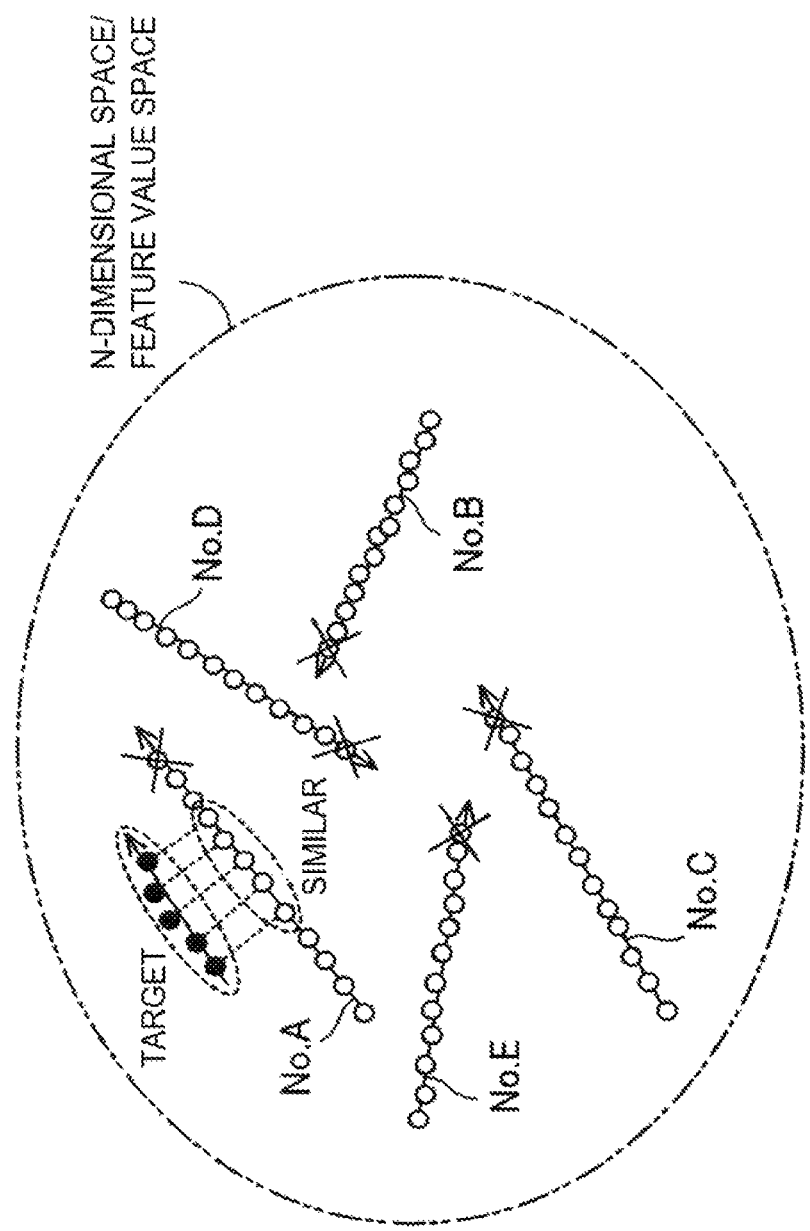
FIG. 9 shows a concept of similarity of values to be predicted in the remaining machining times prediction unit, and shows a plurality of learned models (white circles) and values (black circles) to be used for prediction in a feature value space (an n-dimensional space)

For example, in FIG. 9, white circles representing the learned model No. A are at coordinates of the basic data of the learned model No. A in the n-dimensional space. The arrows indicate moving directions of coordinates from the beginning of machining performed by the tool T to the end of the life of the tool T in the basic data on the learned model No. A. The X marks represent the basic data regarding time when a tool has reached an end of a life. That is, as shown in FIG. 9, in the feature value space (the n-dimensional space), a transition of the basic data of each of the plurality of learned models changes into respective directions at respective positions.

Here, in FIG. 9, the prediction target data is indicated by black circles and an arrow. FIG. 9 shows a case of a set of prediction target data for five times. Then, the prediction unit 83 selects, from the basic data on each of the plurality of learned models, basic data similar to prediction target data (the black circles) of a plurality of times. For example, FIG. 9 shows that, in the basic data on the learned model No. A, a part surrounded by a dashed line is the basic data similar to the prediction target data (the black circles).

The above is conceptually understood as follows. The prediction unit 83 compares a transition (first transition) of the plurality of sets of feature values of the state data as the actual number of actual machining times increases in the plurality of times of machining and a transition (second transition) of the plurality of sets of feature values of the state data the number of machining times increases in the training dataset of each of the plurality of learned models. Then, as a result of comparing the transitions, the prediction unit 83 selects one learned model having a high degree of similarity. In other words, the prediction unit 83 selects one learned model generated with one training dataset having the second transition of the plurality of sets of feature values of the state data, the second transition having a highest degree of similarity to the first transition, among the plurality of training datasets.

Further, as shown in FIG. 9, in the feature value space (the n-dimensional space), it is determined that a degree of similarity is higher as a value corresponding to a distance in the n-dimensional space is smaller by comparing a combination of the basic data with a combination of the prediction target data. The combination of the basic data is a combination of a plurality of feature values of the state data as the number of machining times in the training dataset increases. The combination of basic data is a combination of a plurality of feature values of the state data as the number of actual machining times in a prediction target increases.

The degree of similarity is determined to be high using any one of the Euclidean distance, the Mahalanobis distance, the Manhattan distance, and the Chebyshev distance. That is, the prediction unit 83 selects one learned model having the highest degree of similarity (a distance-equivalent value being smallest) using any one of the above-described distances.

Subsequently, the prediction unit 83 predicts the number of remaining machining times (second remaining machining times) using the selected one of the learned models and the plurality of feature values of the state data (step S4). As described above, the learned model is generated by executing machine learning with the plurality of feature values of the state data as explanatory variables and the number of remaining machining times (first remaining times) as an objective variable. Therefore, the learned model can output the number of remaining machining times (second remaining times), which is the objective variable, by setting the plurality of feature values, which are the explanatory variables, as input data.

Subsequently, the prediction unit 83 determines, as a result of the prediction, whether the target tool T has reached the end of a life (step S5). When determining that the target tool T has not reached the end of a life (step S5: No), the prediction unit 83 returns to step S1, and predicts the number of remaining machining times again for a next time of machining. When determining that the target tool T has reached the end of a life (step S5: Yes), the prediction unit 83 ends the prediction processing.

Next, examples of displayed contents of the display devices 40, 50 will be described with reference to FIGS. 10 to 13. Here, the contents may be displayed on either of the display devices 40, 50 as described above. The displayed contents are an example, and the present invention is not limited thereto.

As shown in FIGS. 10 to 13, for example, the display devices 40, 50 show a graph in which the number of actual machining times of the target tool T is a horizontal axis and the predicted number of remaining machining times is a vertical axis. Black circles plot points representing machining which has already done, and a white circle plots a point representing prediction which is currently carried out. That is, a transition in the prediction for the number of remaining machining times up to the present is displayed by the white circle and a plurality of black circles.

Further, learned models being used for the present prediction are displayed above the graph in FIGS. 10 to 13. As described in the above-described processing of the prediction unit 83, the learned model used for prediction is selected anew each time of machining, i.e., the learned model used for prediction is selected each time the number of machining times increases, and thus the learned model selected for prediction may change each machining time. Of course, the same learned model may continue to be selected from the beginning of machining using the target tool to an end of its life. Therefore, the currently selected learned model is displayed on the display devices 40, 50.

Further, in the display devices 40, 50, a life expectancy prediction tendency (an inclined dashed line) according to the currently selected learned model is displayed. It indicates that transition will be along a line of the life expectancy prediction tendency if a target tool continues to be predicted by the currently selected learned model. A point at which the number of remaining machining times is zero in the line of the life expectancy prediction tendency indicates the number of machining times (second machining times) that would be performed by the target tool T.

Figure 10:
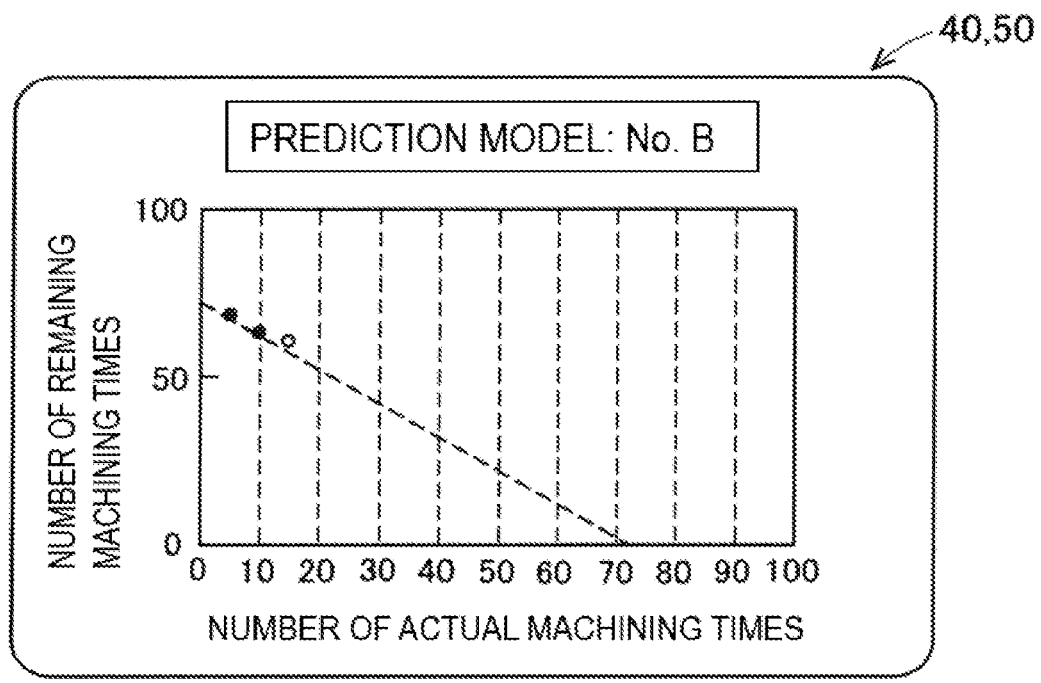
FIG. 10 shows a displayed content on a display device, and shows a displayed content when the number of actual machining times is 15 in which a dashed line indicates a tendency of life expectancy prediction obtained by a selected learned model.

Hereinafter, each of the drawings will be described in detail. FIG. 10 shows a case in which the number of actual machining times of the target tool T is 15, and the number of remaining machining times is approximately 60. Further, the learned model used for the current prediction is No. B. In FIG. 10, predicted results are displayed with the actual numbers of actual machining times are 5 and 10. It can be seen that when the number of actual machining times is 5, the number of remaining machining times is predicted to be approximately 70, and when the number of actual machining times is 10, the number of remaining machining times is predicted to be approximately 65. In FIG. 10, plotting is executed every five times of machining. However, plotting may be executed every time.

Figure 11:
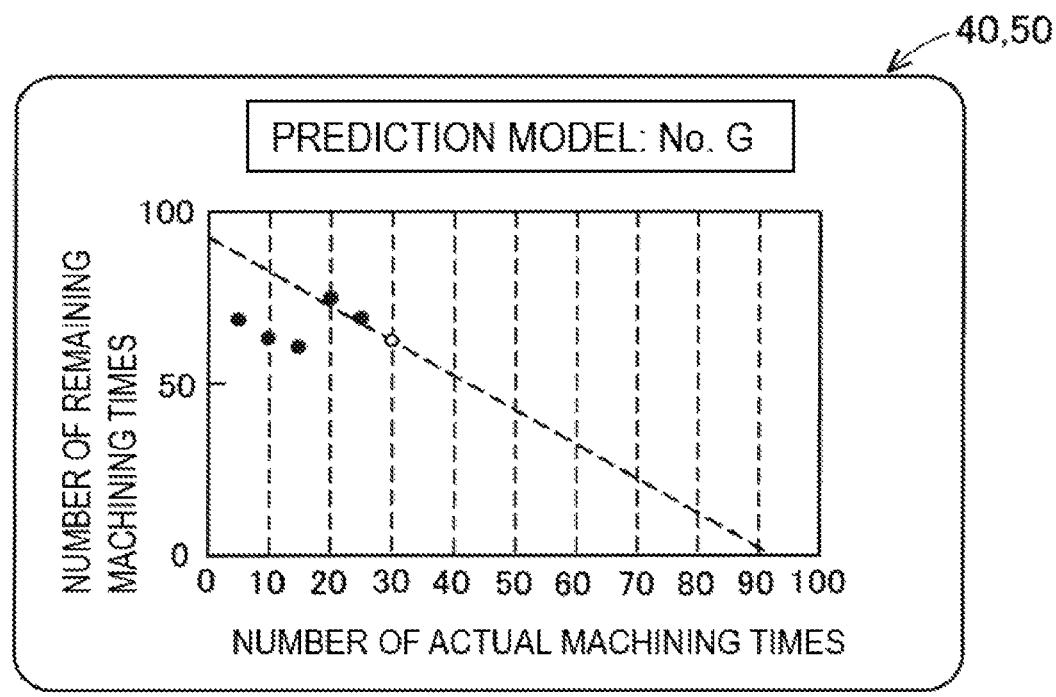
FIG. 11 shows a displayed content on the display device, and shows a displayed content when the number of actual machining times is 30 in which a dashed line indicates a tendency of life expectancy prediction obtained by the selected learned model.

FIG. 11 shows a case in which the number of actual machining times of the target tool T is 30, and the number of remaining machining times is approximately 65. Further, the learned model used for the current prediction is No. G. In FIG. 11, predicted results are displayed when the numbers of actual machining times are 5, 10, 15, 20, and 25. Here, it can be seen that a life expectancy prediction tendency of first 15 times and a life expectancy prediction tendency of 20 to 30 times are different.

If the life expectancy pattern of the tool T that is very similar to the target tool T being subject to the present prediction is already learned, and if a state of the workpiece machined by the tool T, whose case is already learned, is very similar to a state of the workpiece W which is currently subject to a predication, the number of remaining machining times may be predicted with high accuracy. However, in reality, due to, for example, a slight difference in a surface treatment of the tool T or a slight difference in a quenching state of the workpiece W, etc., it is quite rare to reproduce a machining state/situation very similar to that which has already been learned in the past. Therefore, each time the prediction processing is executed, the selected learned model may change resulting in variations in the prediction results. In fact, there is no problem in a fact that variations occur in the prediction results, but rather, an advantage thereof is that, variations in the prediction results can indicate that the prediction accuracy is not so high. Consequently, the display devices 40, 50 displays the most accurate prediction result at that time.

Figure 12:
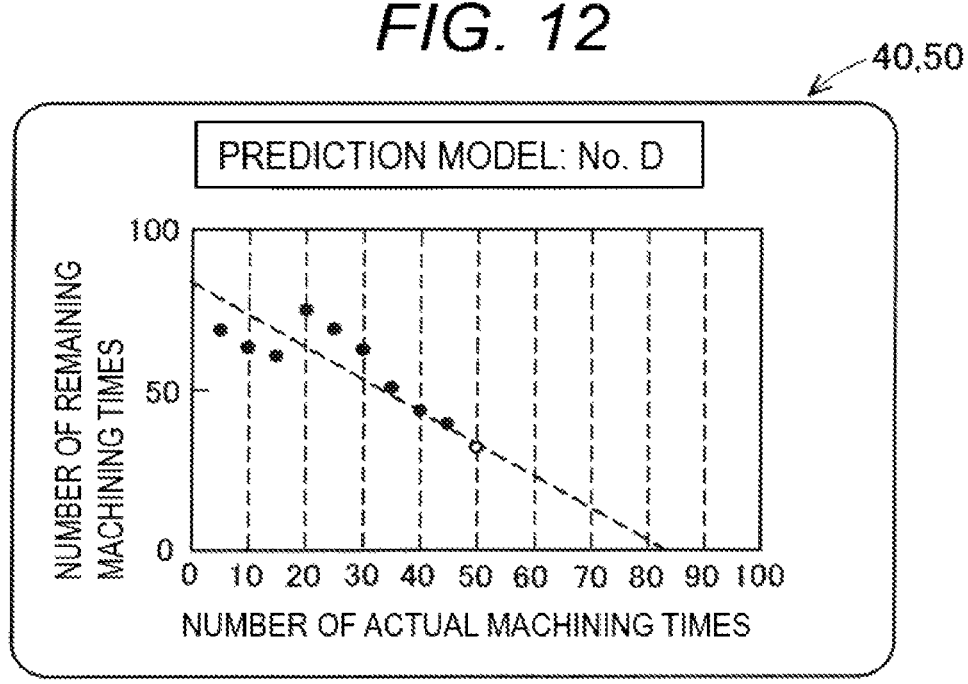
FIG. 12 shows a displayed content on the display device, and shows a displayed content when the number of actual machining times is 50 in which a dashed line indicates a tendency of life expectancy prediction obtained by the selected learned model.

FIG. 12 shows a case in which the number of actual machining times of the target tool T is 50, and the number of remaining machining times is approximately 30. Further, the learned model used for the current prediction is No. D. In FIG. 12, the predicted results made at each time of machining time being between 5 and 50, meaning one prediction having been made every 5 times of machining, are shown.

Figure 13:
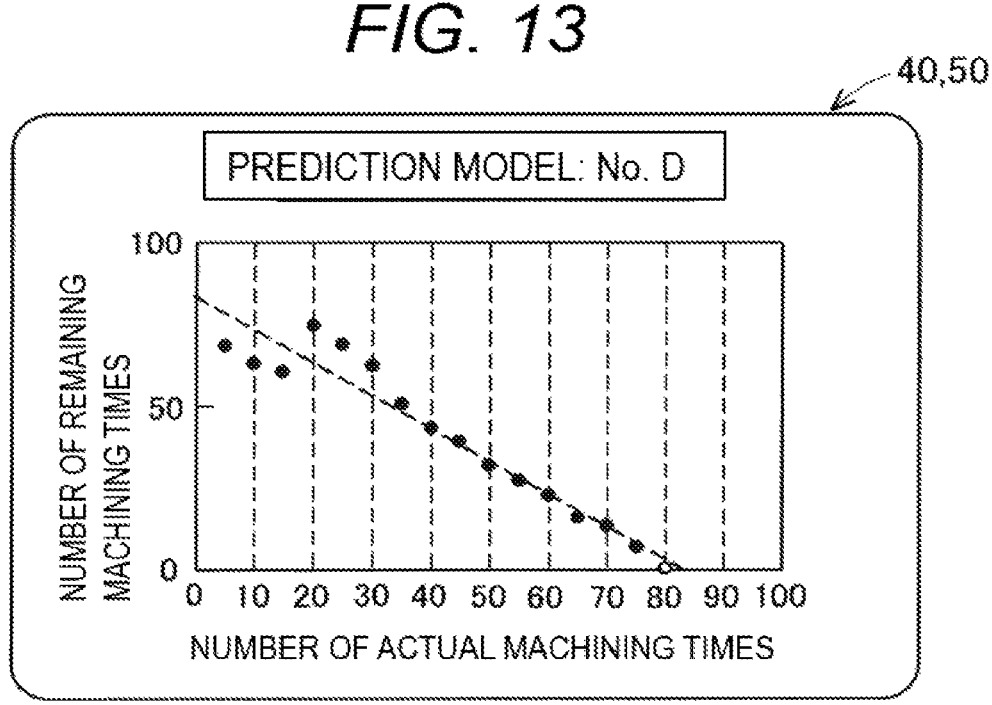
FIG. 13 shows a displayed content on the display device, and shows a displayed content when the number of actual machining times is 80 (when a tool has reached an end of a predicted life) in which a dashed line indicates a tendency of life expectancy prediction obtained by the selected learned model.

FIG. 13 shows a case in which the target tool T has reached the end of a life, and the number of actual machining times when the tool T reaches the end of a life is 80. Further, the learned model used for the prediction when the tool T reaches the end of a life is No. D.

According to the life expectancy prediction system 1 for a target tool, one learned model is selected from a plurality of learned models, and a life expectancy of the currently used tool T is predicted using the selected one learned model. The selection of one learned model to be used for predicting the life expectancy of the target tool T uses state data of machining performed by the tool T. Therefore, the selected one learned model corresponds to the tool T. In this way, one learned model used for predicting the life expectancy of the tool T corresponds to the respective tool T, so that it is possible to predict the life expectancy of the tool T with high accuracy.

Further, the display devices 40, 50 display the number of remaining machining times of the tool T subjected to the life expectancy prediction. Therefore, an operator can easily grasp the number of remaining machining times of the tool T by checking the display devices 40, 50.

What is claimed is:
1. A life expectancy prediction system for a target tool comprising:
 a processing machine body configured to machine a workpiece using a tool;

a detector configured to detect an observable state in the processing machine body during machining of the workpiece and to obtain data including the observable state as a state data;

a learned model storage unit configured to store a plurality of learned models generated by executing machine learning using a plurality of training datasets, each of the plurality of learned models including an explanatory variable and an objective variable, the explanatory variable being the state data and the objective variable being a number of first remaining machining times based on a number of first machining times for which the tool had machined the workpiece until the tool has failed, the learned model storage unit being configured to store the plurality of the learned models for each of a plurality of life expectancy patterns of a plurality of the tools; and a remaining machining times prediction unit configured to:
- select, based on the state data, one learned model out of the plurality of learned models;
- predict a number of second remaining machining times based on a number of second machining times for which the target tool is predicted to be able to machine the workpiece until the target tool fails, using the one learned model and the state data;
- acquire, for the target tool, the state data of a last plurality of times of machining of the workpiece and information indicative of an actual number of actual machining times by the target tool, the actual number being equal to a number of the last plurality of times of machining; and
- select the one learned model based on the state data and the information.

2. The life expectancy prediction system for the target tool according to claim 1,
wherein the remaining machining times prediction unit is configured to:
- compare a first transition of the state data as the actual number of actual machining times by the target tool increases with a second transition of the state data as a number of machining times by the tool increases in the plurality of training datasets;
- select, based on the comparison, the one learned model generated with one training dataset having the second transition of the state data, the second transition having a highest degree of similarity to the first transition, among the plurality of training datasets; and
- predict the number of second remaining machining times using the one learned model and the state data.

3. The life expectancy prediction system for the target tool according to claim 2,
wherein the first transition is a transition of a plurality of feature values of the state data as the actual number of actual machining times increases and the second transition is a transition of a plurality of feature values of the state data as the number of machining times increases in the training dataset.

4. The life expectancy prediction system for the target tool according to claim 3,
wherein, in a feature value space that represents the feature value as a dimension element, it is determined that a degree of similarity is higher as a value corresponding to a distance in the feature value space is smaller by comparing a combination of the plurality of feature values of the state data as the number of machining times in the training dataset increases with a combination of the plurality of feature values of the state data as the actual number of actual machining times increases.

5. The life expectancy prediction system for the target tool according to claim 4,
wherein the degree of similarity is determined using any one of a Euclidean distance, a Mahalanobis distance, a Manhattan distance, and a Chebyshev distance.

6. The life expectancy prediction system for the target tool according to claim 1,
wherein the plurality of learned models are generated by generating one learned model for one tool among a plurality of tools of same type, and
wherein the learned model storage unit is configured to store the plurality of learned models for each of the plurality of life expectancy patterns of the plurality of tools of the same type, defining that the plurality of life expectancy patterns of the plurality of tools of the same type are different to each other.

7. The life expectancy prediction system for the target tool according to claim 1,
wherein the processing machine body is configured to cut or grind the workpiece using a rotary tool, and
wherein the state data includes drive load data of a motor configured to rotationally drive the rotary tool.

8. The life expectancy prediction system for the target tool according to claim 7,
wherein the processing machine body is configured to cut or grind the workpiece while rotating the workpiece using the rotary tool, and
wherein the state data further includes drive load data of another motor configured to rotationally drive the workpiece.

9. The life expectancy prediction system for the target tool according to claim 1 further comprising:
a display device configured to display the number of second remaining machining times which has been predicted.

10. The life expectancy prediction system for the target tool according to claim 9,
wherein the display device is configured to further display the learned model used for predicting the number of second remaining machining times out of the plurality of learned models.

11. The life expectancy prediction system for the target tool according to claim 1, further comprising:
a model generation unit configured to generate the plurality of learned models for each of the plurality of life expectancy patterns by executing machine learning using the plurality of training datasets including the explanatory variable and the objective variable.

* * * * *